United States Patent
Shinno et al.

[11] Patent Number: 5,141,585
[45] Date of Patent: Aug. 25, 1992

[54] METHOD OF AND APPARATUS FOR PREVENTING SIDEWISE DEVIATION OF TAPE

[75] Inventors: Nobuo Shinno, Sakai; Yasuhiro Ohnishi, Osaka; Toshikazu Shigematsu, Sakai, all of Japan

[73] Assignee: Shinnippon Koki Kabushiki Kaisha (Shinnippon Koki Co., Ltd.), Osaka, Japan

[21] Appl. No.: 576,138

[22] Filed: Aug. 29, 1990

Related U.S. Application Data

[63] Continuation of Ser. No. 308,715, Feb. 9, 1989, abandoned.

[30] Foreign Application Priority Data

Feb. 16, 1988 [JP] Japan ................... 63-33120

[51] Int. Cl.⁵ ............................................. G05G 15/00
[52] U.S. Cl. ...................... 156/350; 226/20; 226/21; 156/361; 156/574
[58] Field of Search ............. 156/360, 361, 363, 350, 156/351; 226/21, 20, 22, 23, 18

[56] References Cited

U.S. PATENT DOCUMENTS

| | | | |
|---|---|---|---|
| 3,574,040 | 4/1971 | Chitwood et al. | 226/21 X |
| 4,572,417 | 2/1986 | Joseph | 226/21 X |
| 4,696,707 | 9/1987 | Lewis et al. | 156/361 X |
| 4,750,965 | 6/1988 | Pippel et al. | 156/361 |
| 4,913,328 | 4/1990 | Schulz | 226/20 X |

*Primary Examiner*—David A. Simmons
*Assistant Examiner*—Robert Barker
*Attorney, Agent, or Firm*—Jordan and Hamburg

[57] ABSTRACT

In affixing a tape to an adhesion form by pressing the tape thereagainst with a press roller at the forward end of a tape supply head rotatable about a C axis while feeding the tape to the press roller, a method comprising detecting the positions of opposite side edges of the tape during the tape affixing operation with sensors on at least one of the front and rear sides of the press roller, calculating the amount of sidewise deviation of the tape from the resulting detection signals, calculating the required angle of rotation of the press roller about the C axis based on the calculated value, and rotating the press roller about the C axis by an amount corresponding to the amount of sidewise deviation of the tape in a direction opposite to the direction of sidewise deviation of the tape to thereby current the deviation and maintain the amount of sidewise deviation within a very small range. An apparatus for practicing the method is also disclosed.

8 Claims, 8 Drawing Sheets

METHOD OF AND APPARATUS FOR PREVENTING SIDEWISE DEVIATION OF TAPE

This application is a continuation of application Ser. No. 308,715, filed Feb. 9, 1989, now abandoned.

BACKGROUND OF THE INVENTION AND RELATED ART STATEMENT

The present invention relates to a method of and an apparatus for correcting sidewise deviation of a tape of composite material to minimize the amount of sidewise deviation for use in apparatus for automatically laminating the tape by affixing the tape to an adhesion form.

In recent years, lightweight plate materials are produced from a tape of composite material, i.e. a tape prepared by impregnating carbon fiber, aramid fiber or like reinforcing fiber with a thermosetting resin, by affixing the tape to the surface of an adhesion form (body) of specified shape to obtain a laminate, and thereafter subjecting the laminate to a curing treatment with application of heat and pressure. Unexamined Japanese Patent Application SHO 58-45057, for example, discloses a known method of automatically affixing such a tape of composite material. With this method, the tape is continuously paid off from a reel and pressed against the surface (curved surface) of the adhesion form with a press roller, the press roller is moved along a predetermined path to successively affix tape portions without leaving a clearance therebetween, and the tape affixing direction is changed from layer to layer, whereby a laminate is obtained.

With the above method, the tape to be affixed inevitably deviates widthwise (sidewise) at the position where it is pressed on by the roller because a sidewise force acts on the tape. The force thus acting appears attributable to various causes, such as a slight difference between the orientation of the press roller and the direction of advance thereof, and a very small difference between the course of the press roller and the path along which the tape is naturally affixed.

By the movement of a tape supply head which is programmed in advance, tape portions should be affixed with a minute clearance provided therebetween, while the movement of the supply head is predetermined on the premise that no sidewise deviation of the tape occurs at the press roller portion. Accordingly, if the tape deviates sidewise at this portion, the minute clearance will not be maintained between tape portions but a large clearance occurs, or conversely, a tape portion is likely to lap over another.

Further if a sidwise deviation occurs, the tape becomes locally unpressed by the roller and remains incompletely adhered. When the laminate is then treated for curing, the plate material obtained will not have the specified quality, for example, in respect of strength.

It is therefore necessary to maintain the amount of sidewise deviation of the tape within a very small range and to correct a sidewise deviation, if any. Nevertheless, it is impossible to manually correct sidewise deviations while the tape is being continuously paid off and affixed. Further if the tape greatly deviates sidewise, creating between the adjacent tape portions a clearance larger than is specified or a lap, there arises a need to interrupt the affixing operation to remove the tape or affix the tape again from the starting end of the current tape course, hence a very cumbersome procedure.

SUMMARY OF THE INVENTION

The main object of the present invention, which has been accomplished to eliminate these drawbacks of the prior art, is to provide a method of and an apparatus for readily correcting and preventing the sidewise deviation of a tape during a continuous tape affixing operation.

The present invention provides a method comprising detecting the positions of opposite side edges of a tape during a tape affixing operation with sensors on at least one of the front and rear sides of a press roller at the forward end of a tape supply head, calculating the amount of sidewise deviation of the tape from the resulting detection signals, calculating the required angle of rotation of the press roller about a C axis based on the calculated value, and rotating the press roller about the C axis by an amount corresponding to the amount of sidewise deviation of the tape in a direction opposite to the direction of sidewise deviation of the tape to thereby correct the sidewise deviation of the tape and maintain the amount of sidewise deviation within a very small range.

The invention further provides an apparatus comprising a tape supply head having a tape press roller at its forward end and rotatable about a C axis, sensors for detecting the positions of opposite side edges of a tape at the front and rear sides of the press roller, calculation means for calculating the detection signals from the sensors to detect the amount of sidewise deviation of the tape and calculating the required angle of rotation of the tape supply head about the C axis in accordance with the amount of sidewise deviation, and means for rotating the tape supply head about the C axis based on a signal from the calculation means.

With the method and apparatus of the invention, the sidewise deviation of the tape, if any, is detected by the sensors while the tape is being continuously affixed, the required correction data is calculated from the resulting detection signals, and the tape supply head is rotated about the C axis in accordance with the correction data, whereby the sidewise deviation of the tape is automatically corrected while the tape is being continuously afficed. Consequently, the amount of sidewise deviation is maintained within a very small range.

BRIEF DESCRIPTION OF THE DRAWINGS

FIGS. 1 (a), (b), (c) and (d) are diagrams for illustrating the principle of the method of correcting sidewise deviations of tape according to the invention;

DESCRIPTION OF THE PREFERRED EMBODIMENT

Figure 1A:
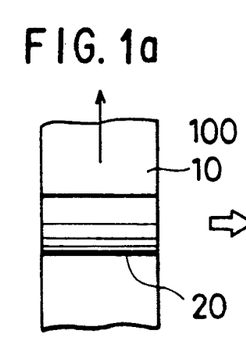
Figure 1B:
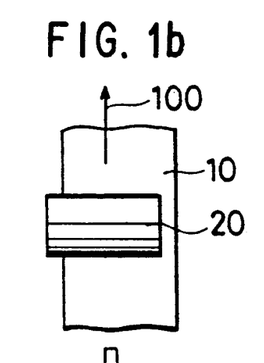
Figure 1C:
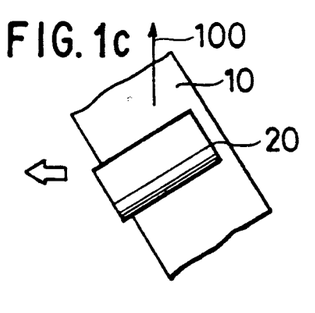
Figure 1D:
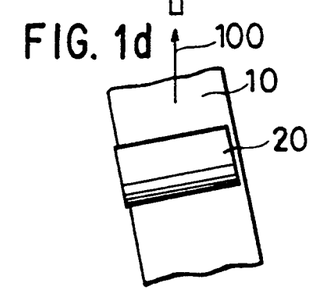
Figure 2:
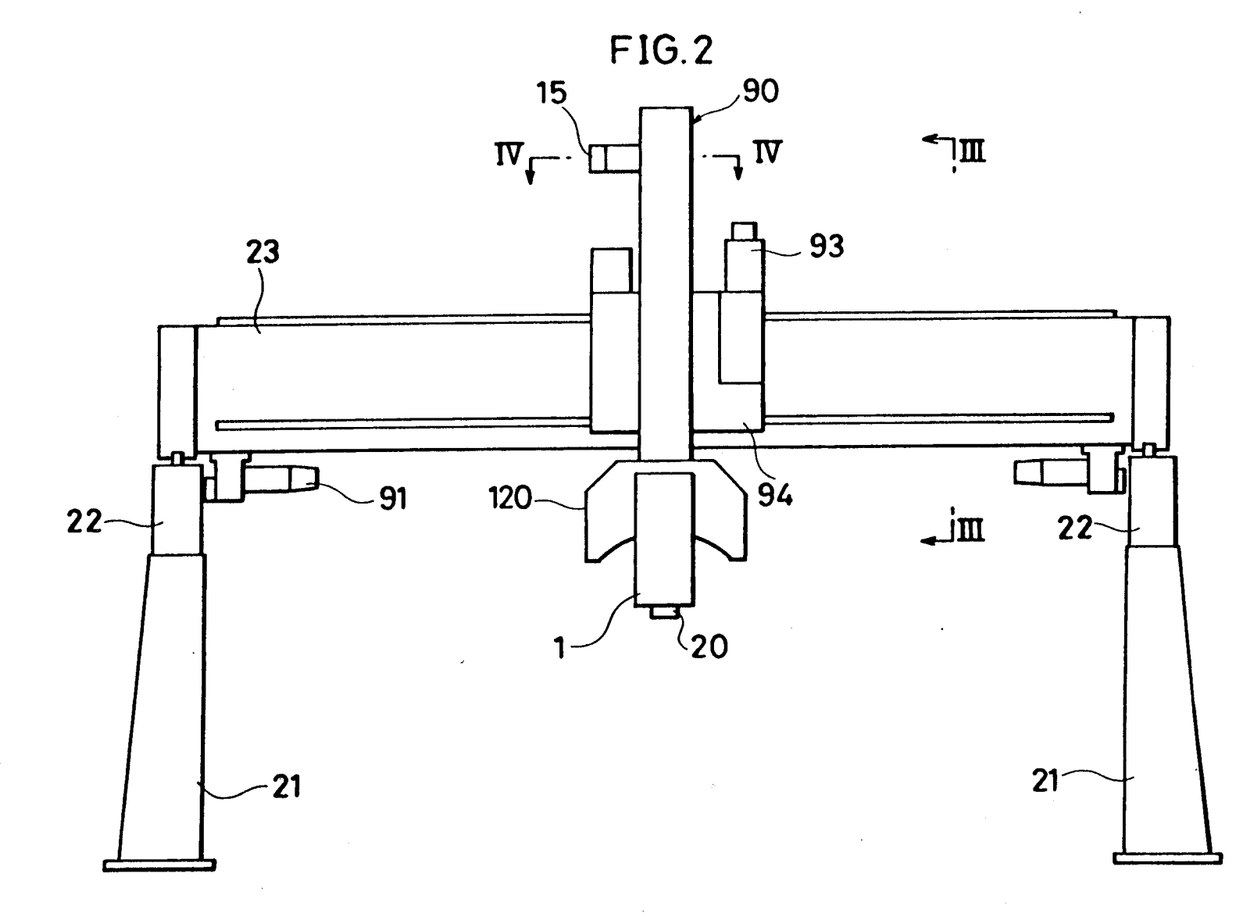
FIG. 2 is an overall front view schematically showing an apparatus embodying the invention.
Figure 3:
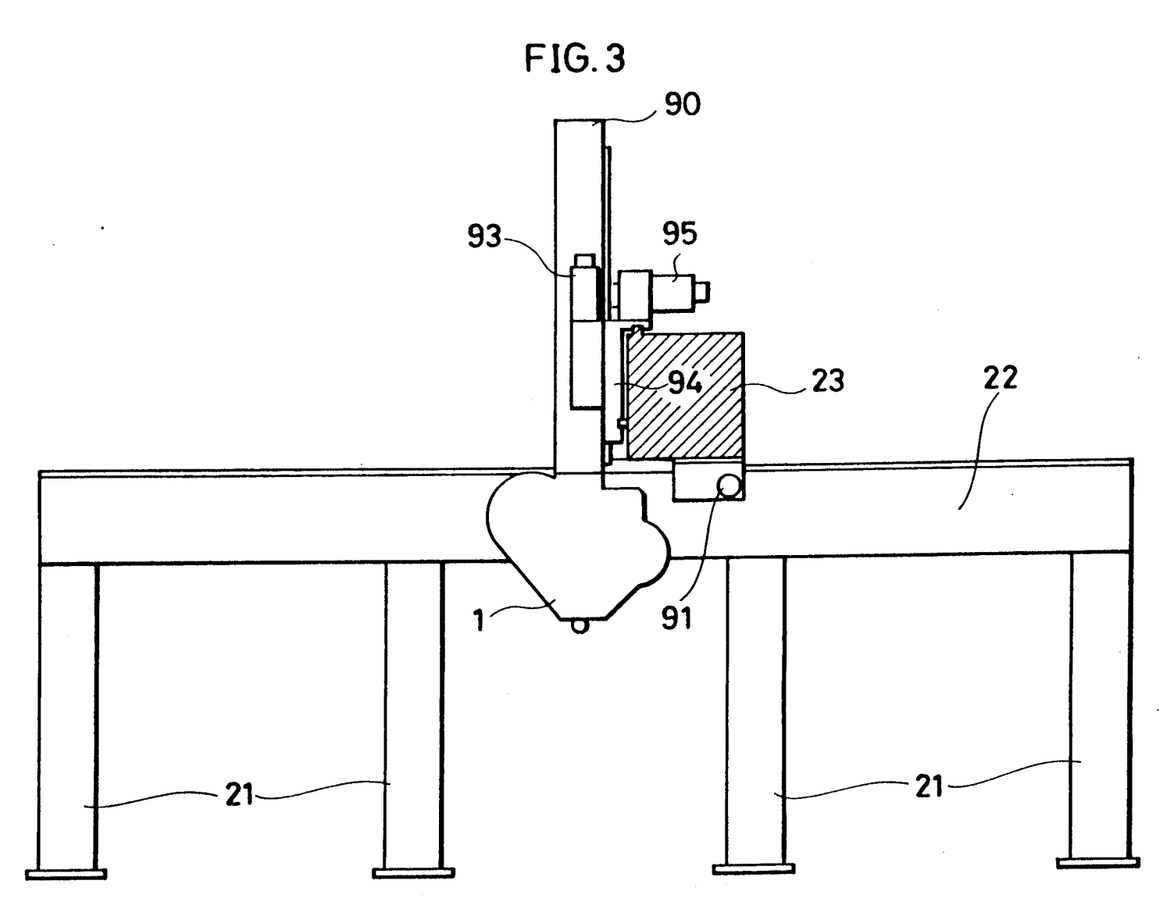
FIG. 3 is a view in section taken along the line III—III in FIG. 2.

With reference to FIGS. 2 and 3, a pair of side rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y axis servomotor 93 along the cross rail 23 in the direction of Y axis (laterally in FIG. 2). A Z-axis saddle 90 mounted on the Y-axis saddle 94 is movable by a Z-axis servomotor 95 in the direction of Z axis (vertically).

Figure 4:
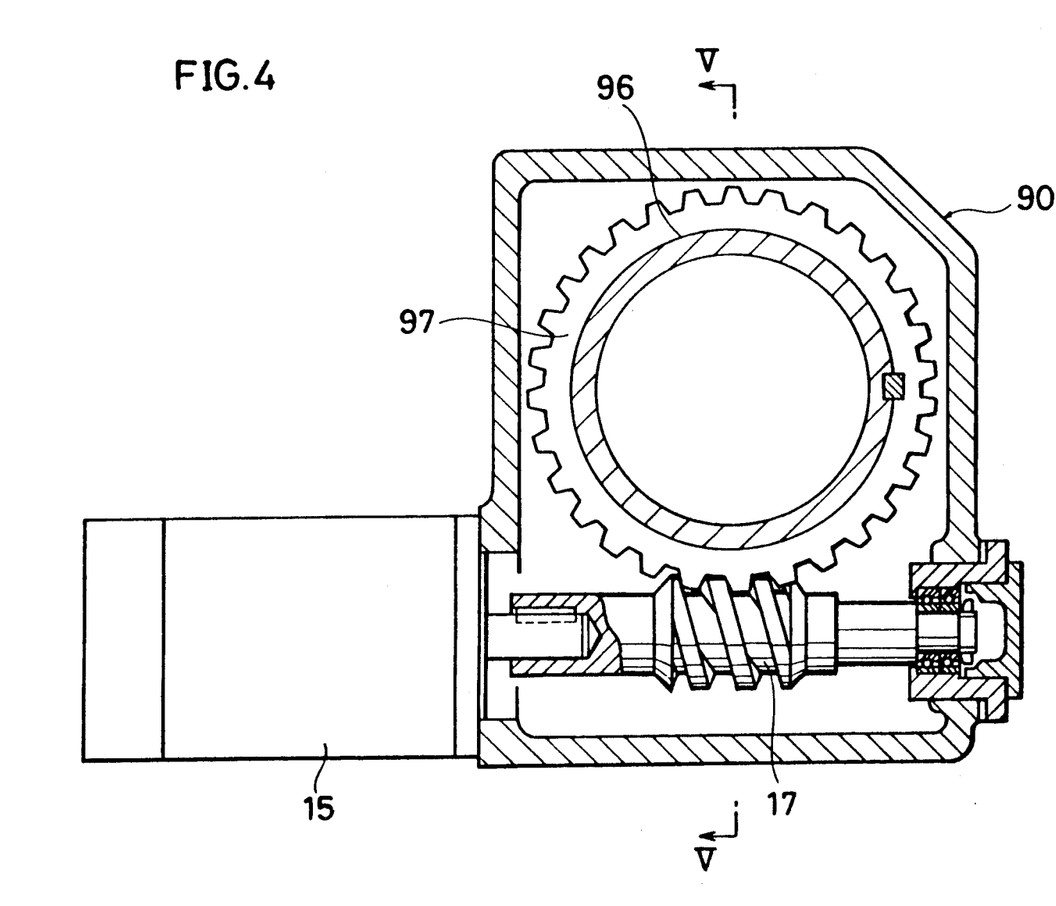
FIG. 4 is an enlarged view in section taken along the line IV—IV in FIG. 2.
Figure 5:
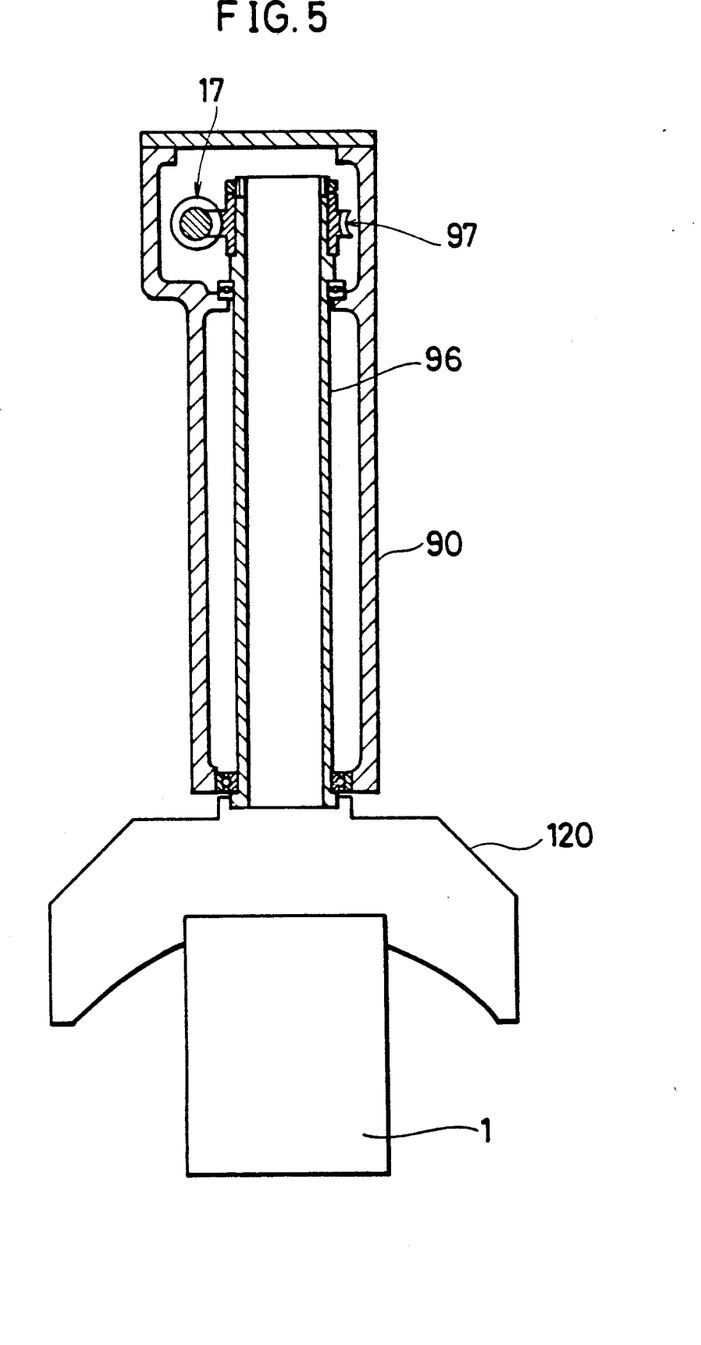
FIG. 5 is a view in section taken along the line V—V in FIG. 4.

A C-axis servomotor 15 is mounted on the Z-axis saddle 90 in the vicinity of its upper end. As shown in FIGS. 4 and 5, a worm 17 is attached to the shaft of the C-axis servomotor 15. A worm wheel 97 in mesh with the worm 17 is mounted on a C-axis rotary shaft 96, which is supported by the Z-axis saddle 90 rotatably about a C axis (vertical axis). A head saddle 20 is attached to the lower end of the rotary shaft 96. A tape affixing head 1 holding the tape press roller 20 to be described later is supported by an unillustrated A-axis guide on the head saddle 120 rotatably about an A axis and is driven by an A-axis servomotor 121 (see FIG. 6).

Accordingly, when the C-axis rotary shaft 96 is rotated about its axis (C axis) by the C-axis servomotor 15 through the worm 17 and the worm wheel 97, the tape affixing head 1 also rotates about the C axis, whereby the press roller 20 held to the head 1 and a tape 10 of composite material passed over the roller 20 are also rotated about the C axis.

Figure 6:
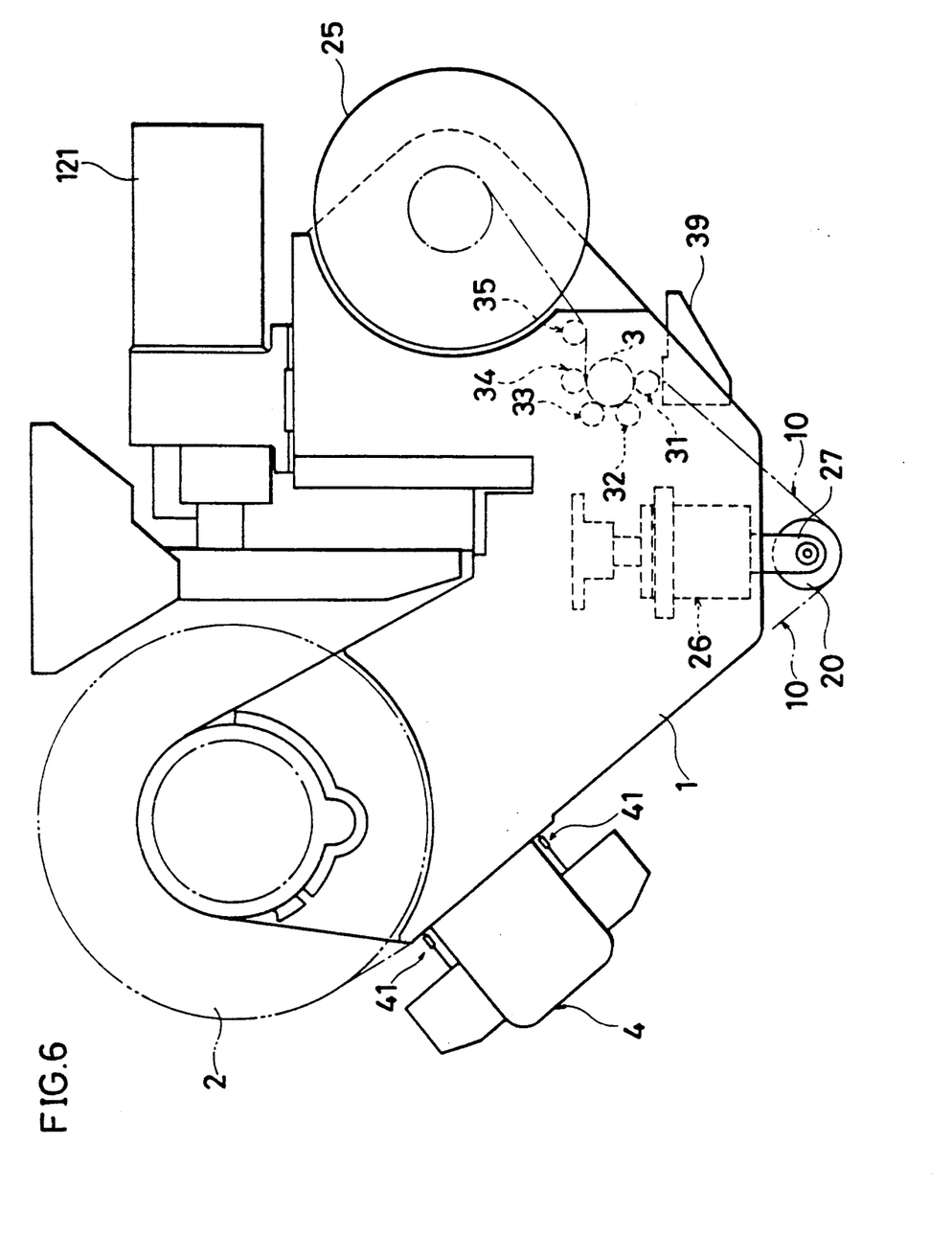
FIG. 6 is a side elevation of a tape affixing head.

With reference to FIG. 6, the affixing head 1 has mounted thereon a tape supply reel 2 with the tape 10 wound thereon, and a take-up reel 25 for winding up the tape 10. The tape 10 paid off from the supply reel 2 passes by cutters 41 of a tape cutting device 4, is reeved around the press roller 20 and then around a drive roller (pinch roller) 3, and is wound on the take-up reel 25. Indicated at 39 is a scrap take collection box.

Holding means 26 attached to the affixing head 1 holds the press roller 20 by a bracket 27. A plurality of driven rollers 31, 32, 33 and 34 are arranged around the drive roller 3 for pressing the tape 10 against the drive roller 3. An auxiliary roller 35 guides the tape 10 in a specified direction when it is delivered from the drive roller 3.

Figure 7:
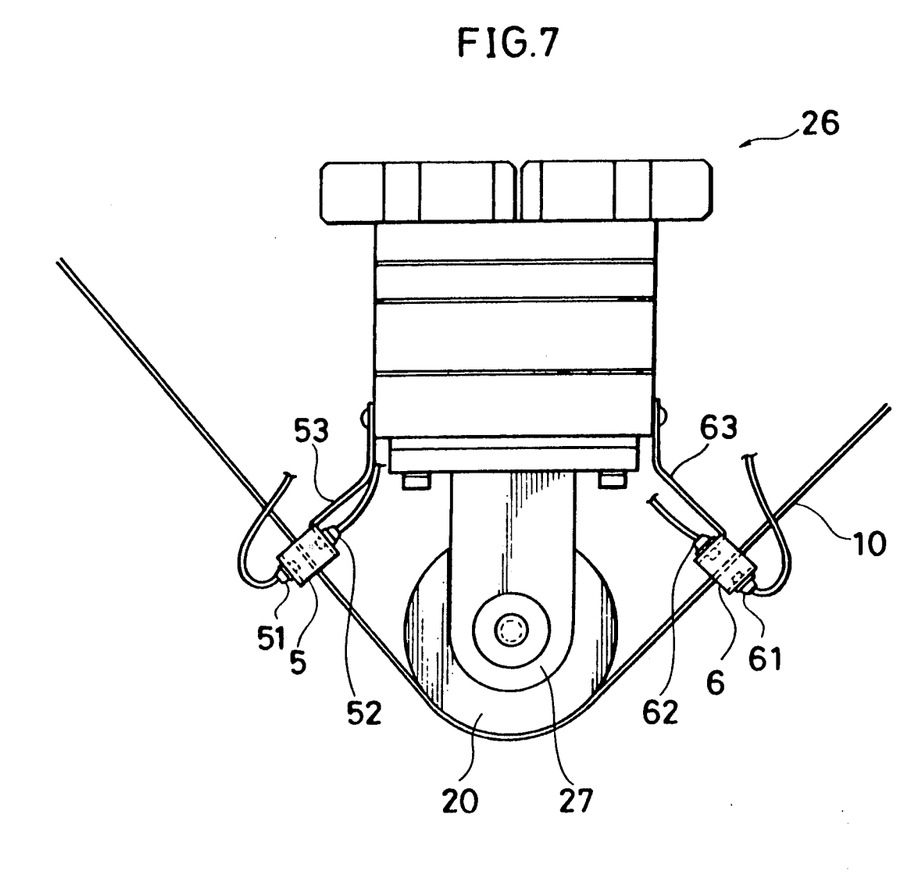
FIG. 7 is an enlarged view showing a press roller portion of the head.
Figure 8:
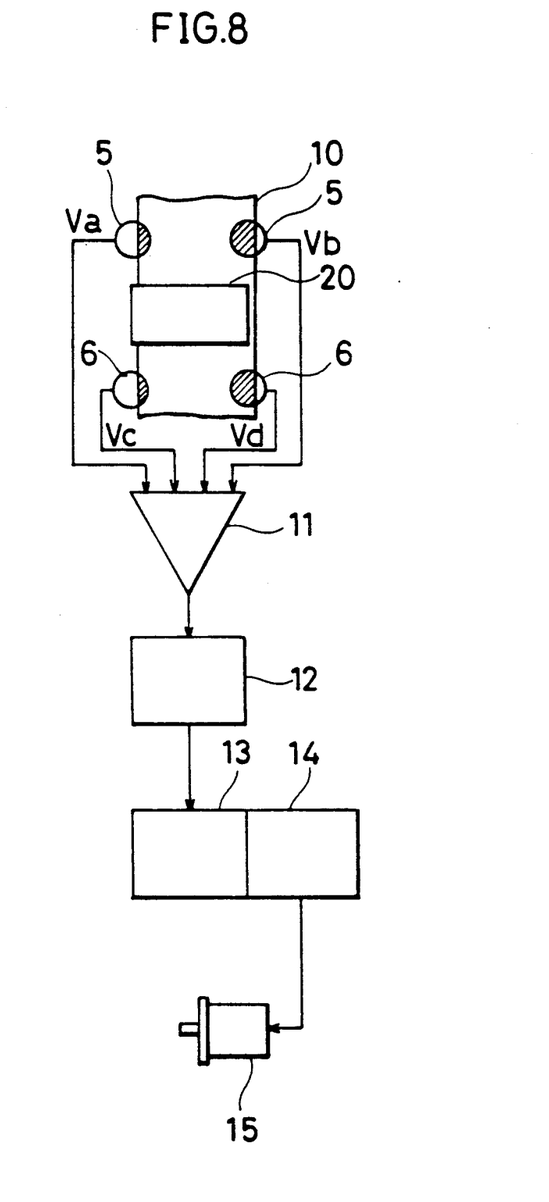
FIG. 8 is a block diagram showing means for calculating the amount of sidewise deviation of the tape and the amount of correction.

With reference to FIG. 7, the holding means 26 is provided with arms 53 and 63 having attached to their respective forward ends sensors 5 and sensors 5 which are positioned at the front and rear sides of the press roller 20, respectively. Each sensor 5 comprises a pair of opposed light projector 51 and photodetector 52 which are mounted on a U-shaped member. Similarly, each sensor 6 comprises a light projector 61 and a photodetector 62 opposed to each other. As seen in FIG. 8, the sensors 5 (6) are arranged at the respective side edges of the tape 10 as opposed to each other, whereby the position of the tape is detected with respect to the transverse or sidewise direction.

The sensors are arranged at opposite sides of the tape 10 to avoid the influence of errors in the width of the tape 10. Although the sensors are arranged at both front and rear sides of the press roller 20 to accurately detect the sidewise deviation of the tape 10 passing over the press roller 20, such sensors may be provided at the front or rear side only of the press roller 20.

Each of the sensors 5, 6 comprises, for example, a subminiature analog sensor of the optical fiber type, and the light projected from the projector 51 (61) is received by the photodetector 52 (62), such that one half of the light incident area of the photodetector 52 (62) will be covered with the tape 10 to block the light. The photodetector 52 (62) produces a voltage corresponding to the amount of light incident on thereon.

With reference to FIG. 8, the output signals from the photodetectors 52, 62 are fed to an analog calculating unit II, which calculates the amount of sidewise deviation of the tape 10. A microcomputer 12 then calculates at a high speed data for correcting the sidewise deviation of the tape 10. The data is fed to a C-axis servo amplifier 14 of an NC unit 13 to forward a specified operation signal to the C-axis servomotor 15.

Assuming that the outputs from the photodetectors 52 and 62 are Va, Vb, Vc and Vd, the amount of sidewise deviation, E, is calculated from the following equation.

$$E = K_1 \times (Va - Vb + Vc - Vd)$$

wherein $K_1$ is the output constant of the photodetectors.

Next, the operation of the present apparatus will be described. The X-axis servomotor 91, Y-axis servomotor 93, Z axis servomotor 95, C-axis servomotor 15 and A-axis servomotor 121 are initiated into operation, and the tape 10 is affixed to an unillustrated adhesion form by pressing the tape against the adhesion form by the press roller 20 at the end of the affixing head 1, and moving the head 1 along the surface of the form along a programmed predetermined course while paying off the tape 10 from the supply reel 2 at a specified speed under specified tension.

Initially, the tape 10 is positioned at the center of the press roller 20 as seen in FIG. 1 (a), but during the affixing operation, the tape 10 is likely to deviate sidewise as shown in FIG. 1 (b) owing to some cause. If such a sidewise deviation occurs the light impinges on the photodetectors 52, 62 over different areas at opposite sides of the tape as illustrated in FIG. 8. The amount of sidewise deviation of the tape 10 is therefore calculated as described above, the C-axis servomotor 15 is operated in accordance with the calculated value to rotate the affixing head 1, and the tape 10 and the press roller 20 are consequently inclined with respect to the direction of advance, 100, of the head 1 as shown in FIG. 1 (c) (for a better understanding, the inclination is illustrated as exaggerated). When the tape 10 and the roller 20 are thus inclined a lateral force acts on the tape 10, with the result that the tape 10 moves toward the center of the press roller 20 to diminish the sidewise deviation as seen in FIG. 1 (d). With a decrease in the amount of sidewise deviation, therefore, the angle of inclination of the head 1 with respect to the direction of advance 100 also decreases, and when the deviation is corrected, the inclination angle decreases to zero as shown in FIG. 1 (a).

Thus, when the tape 10 deviates sidewise, the affixing head 1 is rotated about the C axis in a direction opposite to the direction of the deviation, whereby the sidewise deviation is automatically corrected by a component of force involved in the paying-off and affixing movement of the tape 10. Consequently the amount of sidewise deviation can be maintained within a very small range.

Briefly stated, according to the invention, the sidewise deviation of the tape is detected by sensors during tape affixing operation, the data needed for correcting the deviation is calculated, and the affixing head is rotated about the C axis in accordance with the resulting signal, whereby the deviation of the tape is automatically corrected. This makes it possible to maintain the amount of sidewise deviation of the tape within a very small range. Furthermore, the method described can be practiced by a relatively simple apparatus.

What is claimed is:

1. An automatic tape affixing apparatus utilizing a tape having two lateral edges, comprising a multi-axis means supporting a tape affixing head for movement about and along a plurality of axes said tape affixing head having a tape supply reel and a tape take-up reel, said tape moving along a tape path between said supply reel and said take-up reel, a presser roller on said tape affixing head disposed along said tape path between said supply reel and said take-up reel to thereby define an upstream tape path portion between said supply reel and said presser roller and a downstream tape path portion between said presser roller and said take-up reel, said presser roller being rotatable about a first axis said multi-axis means comprising a rotary means for rotating said tape presser roller about a second axis perpendicular to said first axis, first and second separate sensor means on said tape affixing head disposed at said upstream tape path portion for separately sensing the lateral deviation at each of the two respective lateral edges of said tape at said upstream tape path portion, third and fourth sensor means on said tape affixing head disposed at said downstream tape path portion for separately sensing the lateral deviation at each of the two respective lateral edges of said tape at said downstream tape path portion, and control means operably connected to said first to fourth sensor means and to said rotary means for controlling said rotary means in response to the sensed lateral deviation of said upstream and downstream tape path portions as simultaneously sensed by said first to fourth sensor means to thereby correct said lateral deviation of said tape to avoid the influence of errors in the width of said tape.

2. Apparatus according to claim 1, wherein each of said first to fourth sensor means comprises a separate light projector means and a separate photodetector means opposed to and spaced from the respective light projector means.

3. An automatic tape affixing apparatus utilizing a tape having two lateral edges, comprising a multi-axis means supporting a tape affixing head for movement about and along a plurality of axes, said tape affixing head having a tape supply reel and a tape take-up reel, said tape moving along a tape path between said supply reel and said take-up reel, a presser roller on said tape affixing head disposed along said tape path between said supply reel and said take-up reel to thereby define an upstream tape path portion between said supply reel and said presser roller and a downstream tape path portion between said presser roller and said take-up reel, said presser roller being rotatable about a first axis, said multi-axis means comprising a rotary means for rotating said tape presser roller about a second axis perpendicular to said first axis, first and second separate sensor means on said tape affixing head disposed at said upstream tape path portion for separately sensing the lateral deviation at each of the two respective lateral edges of said tape at said upstream tape path portion, third and fourth sensing means on said tape affixing head disposed at said downstream tape path portion for separately sensing the lateral deviation at each of the two respective lateral edges of said tape at said downstream tape path portion, and control means operably connected to said first to fourth sensor means and to said rotary means for controlling said rotary means in response to the sensed lateral deviation of said upstream and downstream tape path portions as simultaneously sensed by said first to fourth sensor means to thereby correct said lateral deviation of said tape.

4. Apparatus according to claim 1, wherein each of said first to fourth sensor means produces a signal representing the respective lateral deviation, each of said first to fourth means having first to fourth signal transmission means for simultaneous transmitting the respective signal to said control means.

5. Apparatus according to claim 4, wherein said control means is operable to simultaneously receive said transmitted signals from said first to fourth signal transmission means and to correct said lateral deviation based on the simultaneously received signals form said first to fourth signal transmission means.

6. An automatic tape affixing apparatus utilizing a tape having two lateral edges, comprising a multi-axis means supporting a tape affixing head for movement about and along a plurality of axes, said tape affixing head having a tape supply reel and a tape take-up reel, said tape moving along a tape path between said supply reel and said take-up reel, a presser roller on said tape affixing head disposed along said tape path between said supply reel and said take-up reel to thereby define an upstream tape path portion between said supply reel and said presser roller and a downstream tape path portion between said presser roller and said take-up reel, said presser roller being rotatable about a first axis, said multi-axis means comprising a rotary means for rotating said tape presser roller about a second axis perpendicular to said first axis, first and second separate sensor means on said tape affixing head disposed at said upstream tape path portion for separately sensing the lateral deviation at each of the two respective lateral edges of said tape at said upstream tape path portion, third and fourth sensor means on said tape affixing head disposed at said downstream tape path portion for separately sensing the lateral deviation at each of the two respective lateral edges of said tape at said downstream tape path portion, and control means operably connected to said first to fourth sensor means and to said rotary means for controlling said rotary means in response to the sensed lateral deviation of said upstream and downstream tape path portions as sensed by said first to fourth sensor means to thereby correct said lateral deviation of said tape to avoid the influence of errors in the width of said tape.

7. Apparatus according to claim 6, wherein each of said first to fourth sensor means produces a signal representing the respective lateral deviation, each of said first to fourth sensor means having first to fourth signal transmission means for transmitting the respective signal to said control means, said control means being operable to receive and utilize said transmitted signals from said first to fourth signal transmission means and produce an operational signal to correct said lateral deviation based on said first to fourth signals received form said first to fourth signal transmission means.

8. An automatic tape affixing apparatus utilizing a tape having two lateral edges, comprising a multi-axis means supporting a tape affixing head for movement about and along a plurality of axes, said tape affixing head having a tape supply reel and a tape take-up reel, said tape moving along a tape path between said supply reel and said take-up reel, a presser roller on said tape affixing head disposed along said tape path between said supply reel and said take-up reel to thereby define an upstream tape path portion between said supply reel and said presser roller and a downstream tape path portion between said presser roller and said take-up reel, said presser roller being rotatable about a first axis, said multi-axis means comprising a rotary means for rotating said tape presser roller about a second axis perpendicular to said first axis, first and second separate sensor means on said tape affixing head disposed at said upstream tape path portion for separately sensing the lateral deviation at each of the two respective lateral edges of said tape at said upstream tape path portion and producing respective first and second output signals representing the sensed lateral deviation, third and fourth sensor means on said tape affixing head disposed at said downstream tape path portion for separately sensing the lateral deviation at each of the two respective lateral edges of said tape at said downstream tape portion and producing respective third and fourth output signals representing the sensed lateral deviation, and control means operably connected to said first to fourth sensor means and to said rotary means and operable to receive and utilize said first to fourth output signals to calculate the amount of lateral deviation to produce an operational signal for controlling said rotary means in response to the sensed lateral deviation of said upstream and downstream tape path portions as sensed by said first to fourth sensor means to thereby correct said lateral deviation of said tape.

* * * * *